United States Patent [19]

Sapsowitz

[11] 3,912,817

[45] *Oct. 14, 1975

[54] GUM PRODUCT AND METHOD OF MAKING THE SAME

[75] Inventor: Melvin L. Sapsowitz, Clarks Summit, Pa.

[73] Assignee: Topps Chewing Gum, Incorporated, Brooklyn, N.Y.

[ * ] Notice: The portion of the term of this patent subsequent to Jan. 21, 1992, has been disclaimed.

[22] Filed: Jan. 13, 1975

[21] Appl. No.: 540,530

Related U.S. Application Data

[63] Continuation-in-part of Ser. No. 403,152, Oct. 3, 1973, Pat. No. 3,862,338, which is a continuation-in-part of Ser. No. 170,634, Aug. 10, 1971, abandoned.

[52] U.S. Cl. .................................................. 426/5
[51] Int. Cl.² ........................................ A23G 3/30
[58] Field of Search ..................................... 426/3–6

[56] References Cited
UNITED STATES PATENTS

| | | | |
|---|---|---|---|
| 2,438,551 | 3/1948 | Fenimore | 426/3 |
| 3,208,405 | 9/1965 | Beer | 426/5 |
| 3,262,784 | 7/1966 | Bucher | 426/5 |

*Primary Examiner*—Jeanette M. Hunter
*Attorney, Agent, or Firm*—Mark T. Basseches; Paula T. Basseches

[57] ABSTRACT

A chewing gum having a smooth, fine-grained, flaccid skin, nougat-like interior, and having improved shelf life made by providing a gum mixture having from between about 4% to about 8% free water, and containing any of a variety of conventional chewing gum bases, the base comprising not less than about 12% by weight of the total composition, sugar, coloring and flavoring, the mixture is heated to a temperature range of from about 60°C to about 80°C, and the heated liquid mass thereafter poured or extruded into the final desired form, cooled and permitted to age.

4 Claims, No Drawings

GUM PRODUCT AND METHOD OF MAKING THE SAME

This application is a continuation-in-part of my application Ser. No. 403,152, filed Oct. 3, 1973, now U.S. Pat. No. 3,862,338 entitled Cast Chewing Gum Article and Method of Making the Same, which is a continuation-in-part of my application Ser. No. 170,634, filed Aug. 10, 1971, entitled Cast Chewing Gum Article and Method of Making the Same (now abandoned).

BACKGROUND OF THE INVENTION

1. Field of the Invention

The present invention is in the field of chewing gum products and methods of making the same, and more particularly relates to a method of making an improved chewing gum portion or product and the resultant product.

2. The Prior Art

Conventionally, chewing gums are fabricated from ingredients comprising sugar components, bubble gum base, corn syrup, coloring and flavoring.

In the course of manufacture, it is conventional to melt the bubble gum or chewing gum base component and mix the remaining ingredients therewith to achieve full blending. The resultant mass is essentially a tacky solid. The solid may be processed by extruding into various forms, the product being rather porous and homogeneous in physical characteristics, i.e., an increment of gum taken from the surface is essentially identical to a further increment taken from the interior.

While typical formulations are known to become softer in response to heating, they never reach a condition in which they may be described as liquid, in the commonly understood sense of that word, such that they may be poured and will flow into a form, mold or cavity.

If an attempt were made to heat such conventional formulations, it will be found that the product becomes progressively softer reaching a highly tacky or liquid stage. However, when the product is permitted to cool, the resultant gum portion has more of the characteristics of a hard candy than those traditionally associated with chewing gum. Accordingly, the product is unacceptable since the time and effort required to render it chewable is inordinately long.

It is suggested in U.S. Pat. No. 3,208,405 to provide a chewing gum particularly formulated to be liquid, and hence, pourable, at relatively low temperatures, through the use of a high percentage of invert sugar and consequently a relatively high moisture content.

While a gum formulated in accordance with the teachings of the noted patent may be poured at elevated temperatures, the resultant product, after cooling and curing, is essentially shapeless, remaining flowable at ambient temperatures. The product is homogeneous and has a texture not dissimilar to a heavy grease.

The use suggested for the product in said patent is as a filling to be incorporated within a hard candy shell, such that after consumption of the candy shell, there will remain a chewable mass.

SUMMARY

The present invention is predicated upon the discovery that a chewing gum product having new and desirable characteristics may be fabricated by the use of a conventional chewing gum base, added sugar component and the usual color and flavor additives, if the following conditions are observed:

a. the free water content of the formulation, by weight, should be between about 4% to about 8%;

b. the added sugar component should be selected in such manner that when a homogeneous mixture of gum base, sugar component and flavor is heated, the same becomes a pourable liquid having a viscosity of not greater than about 1 million cps. when heated to the temperature range of from about 60°C to about 80°C:

c. the gum base component should equal at least 12% by weight of the total formula.

When a mixture compounded as noted and heated to the range to liquefy the same is thereafter, and while still at a heat sufficient to maintain the same in a liquid phase, poured, extruded, cast or otherwise caused to assume the desired final configuration of the gum portion, and thereafter cooled while in such desired shape, the gum portion, after aging for a period of about 1 to 2 weeks or more, evidences the desirable characteristics hereinabove set forth.

A variety of formulations, and particularly a variety of different sugar concentrations and types, have been found to operate satisfactorily provided the remaining enumerated conditions are maintained.

It is anticipated that still other sugars may advantageously be employed in the formulation and will result in the production of a chewing gum portion having the noted desirable characteristics so long as the other essential parameters are observed, notably 12% or more by weight bubble gum base, 4 to 8% free moisture content, and liquidity below about $10^6$ cps. viscosity when heated to the range of about 60°C to 80°C, provided the liquefied gum is poured or otherwise cast to conform to its final desired configuration in the heated, liquefied condition.

Accordingly, it is an object of the invention to provide an improved chewing gum portion and method of making the same.

It is a still further object of the invention to provide an improved chewing gum article characterized by a smooth, fine-grained textured, flaccid skin portion, encapsulating a chewy, nougat-like interior, the portion evidencing dramatically superior shelf life characteristics as compared with conventionally processed chewing gum formulations including identical formulations to those processed in accordance with the invention.

In accordance with the invention, satisfactory results may be obtained with any of the chewing gum compositions formulated as hereinafter set forth, the percentages in all instances signifying parts by weight.

EXAMPLE I

| | | |
|---|---|---|
| Sucrose | — | 20% |
| Sorbitol | — | 40% |
| Corn Syrup: | 42DE/45Be | 25.3% |
| Gum Base | — | 14% |
| Color & Flavor | — | 0.7% |

EXAMPLE II

| | | |
|---|---|---|
| Sucrose | — | 30% |
| Sorbitol | — | 30% |
| Corn Syrup: | 42DE/45Be | 25.3% |
| Gum Base | — | 14% |
| Color & Flavor | — | 0.7% |

EXAMPLE III

| | | |
|---|---|---|
| Dextrose | — | 55% |
| Starch | — | 3% |
| Corn Syrup: | 42DE/45Be | 27.3% |
| Gum Base | — | 14% |
| Color & Flavor | — | 0.7% |

EXAMPLE IV

| -Continued | | |
|---|---|---|
| Sucrose | — | 30% |
| Dextrose | — | 30% |
| Corn Syrup: | 42DE/45Be | 27.3% |
| Gum Base | — | 12% |
| Color & Flavor | — | 0.7% |
| EXAMPLE V | | |
| Sucrose | — | 30% |
| Dextrose | — | 30% |
| Corn Syrup: | 42DE/45Be | 27.3% |
| Gum Base | — | 12% |
| Color & Flavor | — | 0.7% |
| EXAMPLE VI | | |
| Sucrose | — | 30% |
| Levulose | — | 30% |
| Corn Syrup: | 42DE/45Be | 25.3% |
| Gum Base | — | 14% |
| Color & Flavor | — | 0.7% |

Several satisfactory gum base formulations are set forth in my co-pending application Ser. No. 403,152, filed Oct. 3, 1973, although the invention is by no means to be considered as restricted to such compositions.

The ingredients of any of the noted examples are processed in the manner hereinafter set forth.

In a steam jacketed sigma type mixer there is added the gum base, the latter being molten and at a temperature of about 85° to 90°C. The remaining ingredients, excepting the color and flavor component, are added while continuously mixing, the corn syrup being desirably but not necessarily added second.

After complete distribution is attained, involving a mixing period of about 5 minutes, the color and flavor components are added and mixing is contained until these components also are intimately distributed throughout the mass. The temperature in the course of the procedure does not exceed about 50°C.

After mixing, the tacky gum mass is removed from the mixer and preferably stored for subsequent processing, although such storage is not necessary. In order to form individual gum portions, the mixed gum mass is slowly heated preferably in a water or steam jacketed vessel to a temperature within the range of from about 60°C to about 80°C. It will be recognized that dependent upon the formulation used, the temperature at which the mass assumes the desired liquid phase may vary within the noted range of 60° to 80°C, the variation depending principally upon the type and proportion and moisture content of sugars selected.

Experimentally, it has been determined that the mass reaches a sufficient liquidity when it achieves a viscosity of below about one million centipoise (cps.). When the mass reaches this viscosity or a lower viscosity, it is in condition to be shaped into its final configuration.

The importance of the viscosity of the heated mass is not so much that the process is viscosity dependent, but rather is believed to reside in the presence of a suitably low viscosity as an index for determining whether the mass has reached or will reach within the noted temperature range a stage in which the desired product will be formed after cooling. By way of illustration and without limitation, the following viscosity measurements have been observed, measurements having been derived using a Brookfield H. A. Viscosometer utilizing a No. 6 spindle at a speed of 10 R.P.M.

A. Utilizing the formulation of Example V measured at a temperature of 60°C a viscosity of approximately 200,000 apparent centipoises.

B. Utilizing the formulation of Example II measured at a temperature of 60°C a viscosity of approximately 75,000 apparent centipoises.

The liquid mass may be extruded, poured, cast or otherwise placed in the desired finished configuration. While the manner in which the mass is caused to assume the finished shape is unimportant, it is imperative that the material still be in the liquid phase when it is placed in its final shape or configuration.

The shaping device may comprise a coated paper or plastic form in which the end product is to be sold or the item may be extruded in any of the usual configurations such as bar shapes, rods, etc. The gum portion is permitted to cool and preferably, before sale, to age for a period of about two weeks or more. The portion when subsequently examined, exhibits a fine textured flaccid skin encompassing a nougat-like interior. The texture of the skin is finer grained than conventionally processed chewing gum formulations. Whereas the same formulation conventionally processed will, over a relatively short period of time, evidence a hardening throughout the body of the gum when exposed to atmospheric conditions, the gum portion in accordance with the invention will undergo only a hardening of the skin while maintaining the softness of the interior of the gum. Likewise, where conventional gum will in time undergo significant flavor loss under atmospheric exposure, the gum portion of the present invention will retain its flavor characteristics over a substantially longer period.

The initial chew characteristics of the skin of the gum in accordance with the invention are slightly more resistant than a fresh portion of a gum of the same formulation conventionally processed, the interior portions, on the other hand, being softer than conventional gum. After hydration in the mouth, the chew characteristics of the gum of the invention and conventional gum of the same formulation are identical.

The full explanation for the superior characteristics of the gum in accordance with the invention has not yet been arrived at. Without limitation and by way of theory only, it has been suggested that by processing the gum in the manner set forth, eg, heating until it becomes liquid and shaping to the final configuration while still in the heated condition, there is formed upon cooling and aging a thin skin portion, which skin portion contains a recrystallization structure of the sugar components of an extremely fine grain or nature which form a protective and relatively non-porous blanket or envelope about the interior. It is believed that the non-porosity of the external skin accounts for the substantially improved shelf life of the resultant chewing gum portion.

As previously noted, the chemical or physical phenomena which result in the production of the skin are as yet not understood. It is however noted that such phenomena do not occur unless in the course of fabrication the gum has been heated to a temperature sufficiently high eg, within the range of 60°C to 80°C to render the same a liquid with a viscosity below about one million cps.

It is further noted that in order to permit the formulation to assume the noted viscosity within the temperature range of about 60°C to 80°C, the sugar formulation incorporated in the composition must be especially selected to provide this result. Additionally, it has been determined that unless the moisture content is retained within the range of about 4 to about 8% free moisture (exclusive of water of crystallization) the desired end characteristics are not achieved, formulations having greater water content remaining soft and not developing any significant surface skin and formulations having less moisture not being susceptible to fluidization within the temperature ranges noted.

The desired phenomenon is exhibited so long as the percentage of gum base exceeds about 12% and satisfactory results have been achieved using base concentrations exceeding 60%.

While there is hereinabove set forth a series of formulations differing principally in the sugar components and proportions thereof, the formulations are not to be taken in a limitative sense. It is anticipated that variations may be developed in the proportions of the sugar specifically set forth and/or that other sugars may in combination with the sugars set forth or alone be found to operate satisfactorily.

Accordingly, the invention is not to be deemed as restricted to any special sugar or combination of sugars, but rather in its broadest sense should be interpreted to cover the concepts of processing a gum formulation including a gum base in an amount by weight of 12 or more percent, a moisture content of from 4 to 8% and a combination of sugars, the combination selected being susceptible of permitting the composite formula to be melted or perhaps more accurately to be rendered fluid and pourable (viscosity under about one million cps) in the temperature range of from about 60° to about 80°C. It is recognized that certain sugars will not, within the parameters discussed, provide a formulation susceptible of being fluid in the noted temperature range. For example, a formulation wherein the sugar employed is sucrose, may be heated to the range noted or somewhat higher and achieve the desired pourable condition. However the resultant product, on cooling, will exhibit a hard, almost unchewable characteristic. Additionally, certain sugars will, after heating above the range, become liquid and pourable but upon recooling assume an unacceptably hard characteristic rendering the same unchewable within a reasonable time span.

Thus, the invention is considered to reside not in the selection of any particular sugar ingredient or combination, but rather in the discovery that following the other parameters, notably moisture content, range of heat to liquefy, pouring or forming while hot, etc., a wide variation of sugars may be selected which will provide satisfactory results.

Accordingly, the invention is to be broadly construed within the scope of the appended claims.

What is claimed is:

1. The method of making an improved chewing gum product which comprises mixing gum base in an amount not less than about 12% by weight, flavoring, and an added sugar component, said mixture being characterized by a total free water content in the range of from about 4 to about 8% by weight and being capable of being melted to a viscosity under about one million cps by being heated to a temperature in the range of from about 60°C to about 80°C, heating said gum mixture to a temperature range of from about 60°C to about 80°C to reduce the viscosity of said mixture to a value below about one million cps, thereafter forming said mixture into a desired finished shape while in a liquid phase and, thereafter cooling said shaped gum and permitting the same to age, thereby producing a shaped chewing gum having a relatively impervious fine grained yieldable surface skin surrounding a nougat-like interior.

2. The method in accordance with claim 1 wherein at least about 50% of the sugar component of said composition is comprised of one or more of the sugars selected from the group which includes dextrose, sorbitol, and levulose.

3. The method in accordance with claim 2 wherein said composition also includes corn syrup.

4. A chewing gum comprising gum base, sugar and flavoring, said gum being characterized by a thin flaccid skin sorrounding a nougat-like interior, and having improved shelf life characteristics, said article being manufactured in accordance with the method of claim 1.

* * * * *